United States Patent
Lee et al.

(10) Patent No.: US 9,411,926 B2
(45) Date of Patent: Aug. 9, 2016

(54) METHOD OF PERFORMING CIRCUIT SIMULATION AND GENERATING CIRCUIT LAYOUT

(71) Applicant: TAIWAN SEMICONDUCTOR MANUFACTURING COMPANY, LTD., Hsinchu (TW)

(72) Inventors: Hui Yu Lee, Hsinchu (TW); Feng Wei Kuo, Zhudong Township (TW); Jui-Feng Kuan, Zhubei (TW); Simon Yi-Hung Chen, Hsinchu (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/291,125

(22) Filed: May 30, 2014

(65) Prior Publication Data
US 2014/0282310 A1   Sep. 18, 2014

Related U.S. Application Data

(63) Continuation-in-part of application No. 13/464,401, filed on May 4, 2012, now Pat. No. 8,769,476.

(51) Int. Cl.
*G06F 17/50* (2006.01)

(52) U.S. Cl.
CPC ........ *G06F 17/5081* (2013.01); *G06F 2217/12* (2013.01); *Y02P 90/265* (2015.11)

(58) Field of Classification Search
CPC .................................................. G06F 17/5081
USPC ........................................................ 716/102
See application file for complete search history.

(56) References Cited

U.S. PATENT DOCUMENTS

| 7,337,420 | B2 | 2/2008 | Chidambarrao et al. | |
|---|---|---|---|---|
| 7,542,891 | B2 | 6/2009 | Lin et al. | |
| 2005/0216873 | A1* | 9/2005 | Singh et al. | 716/5 |
| 2005/0229126 | A1* | 10/2005 | Wang et al. | 716/5 |
| 2010/0050138 | A1 | 2/2010 | Chidambarrao et al. | |

* cited by examiner

*Primary Examiner* — Thuan Do
(74) *Attorney, Agent, or Firm* — Hauptman Ham, LLP

(57) ABSTRACT

A method of generating, based on a first netlist of an integrated circuit, a second netlist includes generating layout geometry parameters for at least a portion of the first netlist of the integrated circuit, the portion including a first device. A third netlist is generated based on the first netlist and the layout geometry parameters. A description in the third netlist for modeling the first device is decomposed into a description in a fourth netlist for modeling a plurality of secondary devices. The second netlist is generated based on the fourth netlist.

19 Claims, 10 Drawing Sheets

US 9,411,926 B2

METHOD OF PERFORMING CIRCUIT SIMULATION AND GENERATING CIRCUIT LAYOUT

PRIORITY CLAIM

The present application is a continuation-in-part of U.S. application Ser. No. 13/464,401, filed May 4, 2012, which is entirely incorporated by reference herein.

BACKGROUND

In the course of Integrated Circuit (IC) development, functional density (i.e., the number of interconnected devices per chip area) has generally increased while geometry size (i.e., the smallest component or line that can be created using a fabrication process) has decreased. This scaling down process generally provides benefits by increasing production efficiency and lowering associated costs. At the same time, the scaling down process also increases the significance of layout-dependent effects (LDEs). LDEs include oxide diffusion (OD) layer stress, well stress, and polysilicon stress and impact device characteristics, such as carrier mobility, output impedance, trans-conductance, and/or threshold voltage of a transistor device. The level of the LDEs depends on a dimension of electrical components and the relevant distance among various semiconductor structures. Usually, the LDEs are evaluated with sufficient precision only after the generation of a circuit layout of a circuit design and the extraction of LDE-related parameters based on the circuit layout.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
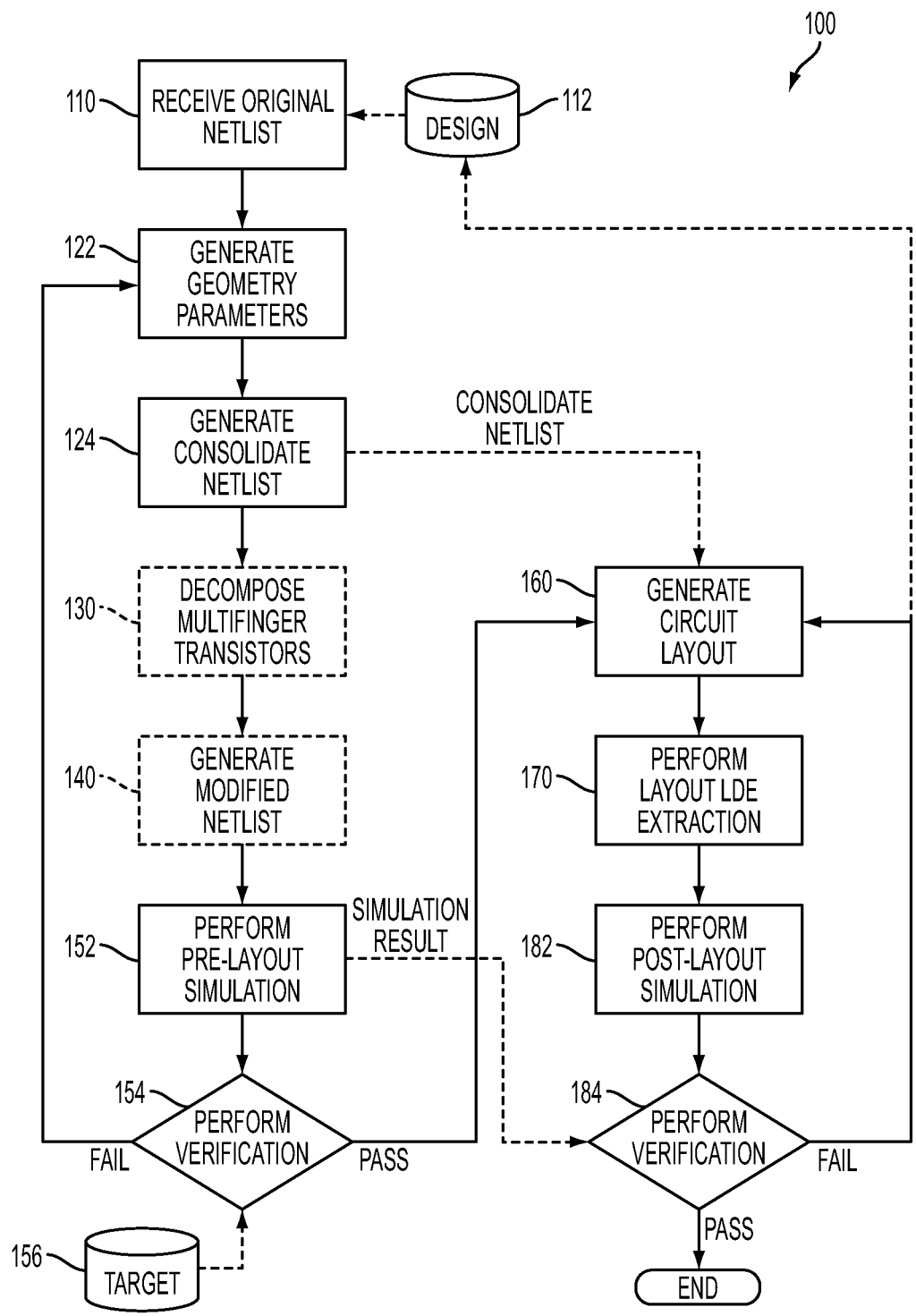
FIG. 1 is a flow chart of a method of generating a circuit layout of a circuit design in accordance with one or more embodiments.

It is understood that the following disclosure provides one or more different embodiments, or examples, for implementing different features of the disclosure. Specific examples of components and arrangements are described below to simplify the present disclosure. These are, of course, examples and are not intended to be limiting. In accordance with the standard practice in the industry, various features in the drawings are not drawn to scale and are used for illustration purposes only.

Moreover, spatially relative terms, for example, "lower," "upper," "horizontal," "vertical," "above," "below," "up," "down," "top," "bottom," "left," "right," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1 is a flow chart of at least a portion of a method 100 of generating a circuit layout of a circuit design 112 in accordance with one or more embodiments. It is understood that additional processes may be performed before, during, and/or after the method 100 depicted in FIG. 1, and that some other processes may only be briefly described herein. In some embodiments, the method 100 is, partially or entirely, performed by a computer system 700 (FIG. 7) having a hardware controller 710 (FIG. 7) executing a set of computer readable instructions (such as computer program code 722 in FIG. 7).

As depicted in FIG. 1, in operation 110, the circuit design 112 of the integrated circuit 200 is received by the controller 710. In some embodiments, the circuit design 112 of the integrated circuit 200 is an electronic file compiled in a circuit schematic format (i.e., an original circuit schematic) that is recognizable by a schematic circuit design software program. The controller 710 is capable of receiving the original circuit schematic and converting the original circuit schematic into an original netlist recognizable by a predetermined simulation software program. A netlist is a text description of a circuit design, such as the circuit design 112, defining instance parameters for modeling a device and interconnection between the device and other nodes or devices. In some embodiments, the circuit design 112 of the integrated circuit 200 is presented as an electronic file compiled in a netlist format (i.e., the original netlist), and thus the format-conversion by the controller 710 is omitted. In some embodiments, the predetermined simulation software program is HSPICE or PSPICE. In some embodiments, the predetermined simulation software program is capable of recognizing netlists compatible to Berkeley Short-channel IGFET Model (BSIM) standard. In at least one embodiment, the original netlist is recognizable by HSPICE and compatible with BSIM standard version 4.5 or later.

Figure 2:
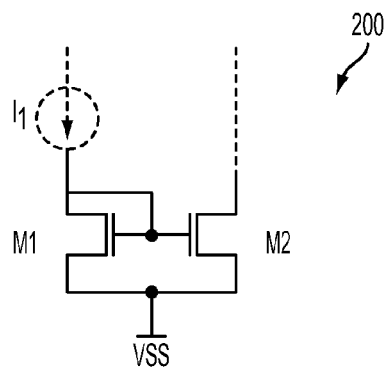
FIG. 2 is a schematic diagram of a portion of an integrated circuit corresponding to a circuit design in accordance with one or more embodiments.

In operation 122, the controller 710 generates a set of layout geometry parameters for at least a predetermined portion of the received original netlist of the integrated circuit 200, such as the description corresponding to transistors M1 and M2 in FIG. 2. The set of layout geometry parameters includes restrictions to be followed for generating a circuit layout for the integrated circuit 200 in a later stage. The layout geometry parameters are set to reduce simulation results between a pre-layout simulation (e.g., operation 152) and a post-layout simulation (e.g., operation 182). In at least one embodiment, layout geometry parameters for analog circuits and timing sensitive logic circuits in the integrated circuit 200 are generated in operation 122. In some embodiments, only layout geometry parameters for analog circuits in the integrated circuit 200 are generated in operation 122. In some embodiments, layout geometry parameters for every component in the integrated circuit 200 are generated in operation 122 of FIG. 1.

In operation 124, a consolidated netlist is generated by combining the original netlist and the layout geometry parameters generated during operation 122. In some embodiments, LDE-related instance parameters in the original netlist are omitted, and the layout geometry parameters generated in operation 110 are inserted for each declared device. In some embodiments, in order to make the consolidated netlist recognizable by the predetermined simulation software program, the layout geometry parameters are added as "comments" of the consolidated netlist or in a form that will be ignored by the predetermined simulation software program. In some embodiments, the layout geometry parameters follow an asterisk or an indicative character/string, which indicates that the text in the same line after the asterisk or the indicative character/string is to be ignored by the predetermined simulation software program.

In operation 130, if a transistor declared or described in the consolidated netlist is a multi-finger transistor, the description for the transistor in the consolidated netlist is further replaced (i.e., decomposed) with description for a plurality of single-finger transistors in the consolidated netlist. In some embodiments, the decomposition of the multi-finger transistor in operation 130 increases the accuracy of circuit simulation with regard to parasitic resistance-capacitance effects. In some embodiments, operation 130 is omitted.

In operation 140, a modified netlist including new LDE-related instance parameters recognizable by the simulation software program is generated based on the consolidated netlist (if operation 130 is omitted) or the decomposed consolidated netlist (if operation 130 is performed). The layout geometry parameters are translated into corresponding LDE-related instance parameters that are directly accessible by the simulation software program. In some embodiments, the LDE-related instance parameters are compatible with BSIM standard version 4.5.

In operation 152, a pre-layout simulation is performed by executing the predetermined simulation software program based on the modified netlist derived from the consolidated netlist. In at least one embodiment, the pre-layout simulation is performed by executing a program such as HSPICE or PSPICE, and the modified netlist is compatible with BSIM standard version 4.5. In some embodiments, the simulation software program used for the pre-layout simulation is capable of processing the layout geometry parameters, and operations 130 and 140 are thus omitted.

In operation 154, the result of the pre-layout simulation performed in operation 152 is compared with a set of predetermined performance targets. If there is a discrepancy between the result of the pre-layout simulation and the set of predetermined performance targets greater than a predetermined first tolerance, the process returns to operation 122. The hardware controller 710, either in response to an input of a circuit designer of the integrated circuit 200 or according to an instruction of a software program being executed for performing the disclosed method 100, generates a set of revised layout geometry parameters to replace the previous set of layout geometry parameters. If the discrepancy between the result of the pre-layout simulation and set of predetermined performance targets is within the predetermined first tolerance, the process moves on to operation 160.

In operation 160, following the definitions provided and restrictions imposed by the layout geometry parameters in the consolidated netlist, a circuit layout of the integrated circuit 200 is generated. After the generation of the circuit layout, in operation 170, a set of LDE parameters is extracted based on the circuit layout generated in operation 160. In operation 182, a post-layout simulation is performed based on the extracted LDE parameters. In some embodiments, operation 170 and operation 182 are performed by executing a post-layout simulation software program that is different from the simulation software program used in operation 152. In some embodiments, operation 170 is performed by executing a layout parasitic parameters extraction program, and operation 182 is performed by the simulation software program used in operation 152 based on the extracted parasitic parameters from operation 170.

In operation 184, after the performance of the post-layout simulation, a result of the post-layout simulation is compared with the result of the pre-layout simulation from operation 152. If a discrepancy between the result of the post-layout simulation and the result of the pre-layout simulation is greater than a predetermined second tolerance, the process returns to operation 160, where the circuit designer or a layout automation software program revises the circuit layout. In some embodiments, instead of returning to operation 160, the circuit design 112 is considered disapproved and a revised circuit design is generated to replace the previous circuit design 112. If the discrepancy between the result of the post-layout simulation and the result of the pre-layout simulation is not greater than the predetermined second tolerance, the generated circuit layout is considered acceptable and is used to manufacture a physical integrated circuit as intended by the original netlist.

According to the method 100, the pre-simulation (operation 152) and the circuit layout (operation 160) are both performed based on the layout geometry parameters provided in the consolidated netlist, and the pre-layout simulation thus has considered layout-dependent effects provided the circuit layout is consistent with the layout geometry parameters set in operation 122. Therefore, compared with a pre-layout simulation without considering the layout-dependent effects or merely based on estimated LDE-related parameters provided in the original netlist, a gap between the results of the pre-layout simulation and the post-layout simulation according to the method 100 is reduced.

In some embodiments, an iteration among layout generation (operation 160), LDE extraction (operation 170) and the post-layout simulation (operation 182) is more time consuming than an iteration among the layout geometry parameter generation (operation 122), the consolidated netlist generation (operation 124), and the pre-layout simulation (operation 154). By closing the gap between the results of the pre-layout simulation and the post-layout simulation using the consolidated netlist, the verification and refinement of the circuit design 112 and the generation of a corresponding circuit layout are more efficiently performed before the layout is generated.

The example integrated circuit 200 and details of the method 100 are described below to further facilitate the explanation of the method 100.

FIG. 2 is a schematic diagram of a portion of the example integrated circuit 200 corresponding to the circuit design 112 in accordance with one or more embodiments. The integrated circuit 200 includes two N-channel Metal-Oxide Semiconductor (NMOS) transistors M1 and M2 connected as a current mirror and a current source I1. A drain terminal of the NMOS transistor M1 is coupled to a gate terminal of the NMOS transistor M2, the gate terminal of the NMOS transistor M2, and the current source I1. Source terminals of the NMOS transistors M1 and M2 are coupled to a negative power supply VSS.

For describing the circuit depicted in FIG. 2, in conjunction with operation 110 in FIG. 1, an example original netlist includes the device declaration and corresponding instance parameters as follows:

M1 (net01 net01 net02 net03) nch_mac l=80n w=240.0n multi=1 nf=1 sd=140.0n ad=2.64e-14 as=2.64e-14 pd=700n ps=700n nrd=0.386341 nrs=0.386341 sa=110.0n sb=110.0n sa1=110.0n sa2=110.0n sa3=110.0n sa4=110.0n sb1=110.0n sb2=110.0n sb3=110.0n spa=3u spa1=3u spa2=3u spa3=3u sap=1.00025u spba=1.73436u spapb=577.831n spba1=1.74128u M2 (net04 net01 net02 net03) nch_mac l=80n w=1.2u multi=1 nf=5 sd=140.0n ad=9.36e-14 as=9.36e-14 pd=2.22u ps=2.22u nrd=0.082297 nrs=0.082297 sa=336.798n sb=336.798n sa1=190.074n sa2=310.915n sa3=516.179n sa4=308.67n sb1=190.074n sb2=310.915n sb3=516.179n spa=238.049n spa1=194.541n spa2=151.427n spa3=161.158n sap=240.466n spba=196.475n sapb=336.445n spba1=200.015n The instance parameters are compatible with BSIM standard version 4.5. Instance parameters sa, sb, sa1, sa2, sa3, sa4, sb1, sb2, sb3, spa, spa1, spa2, spa3, sap, spba, sapb, and spba1 are LDE-related parameters usable to simulate the stresses from various semiconductor structures to the defined transistor device. However, in the original netlist, the LDE-related parameters includes estimated values set by the circuit designer. The definition of the above-identified instance parameters is provided in BSIM standard version 4.5 and is known to a person of ordinary skill in the field of transistor modeling.

Figure 3:
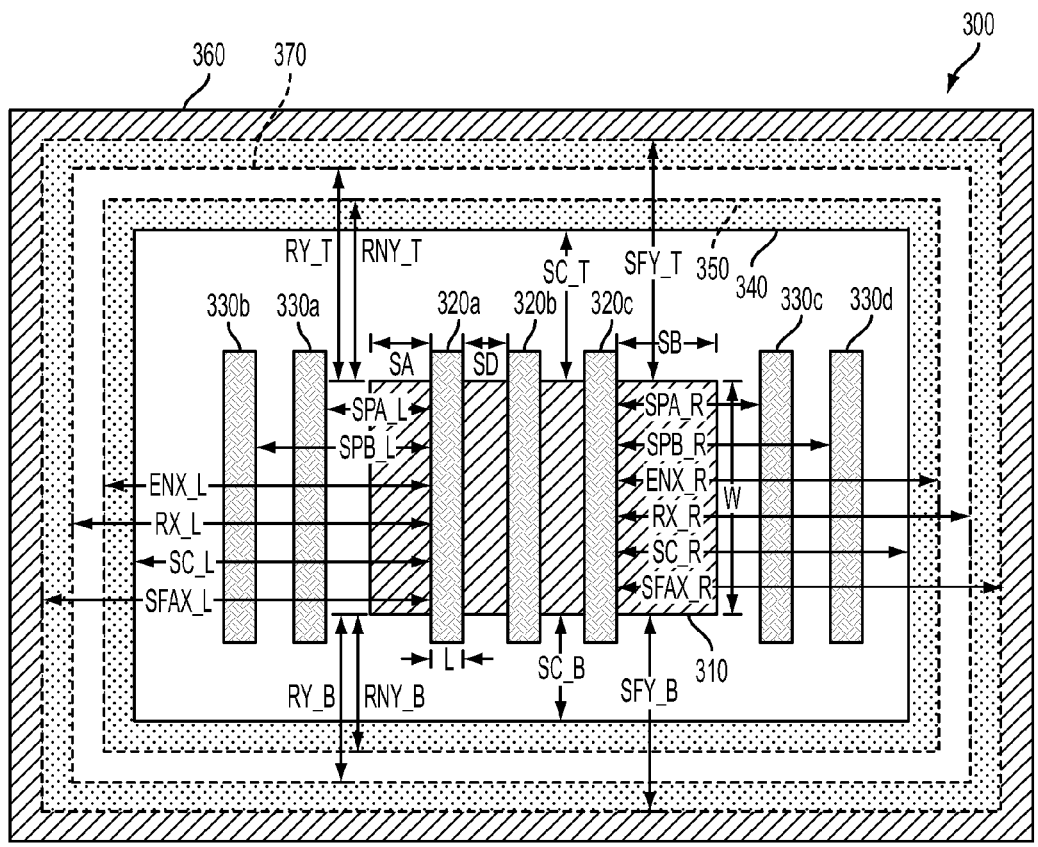
FIG. 3 is a top-view diagram of an example transistor layout in accordance with one or more embodiments.

FIG. 3 is a top-view diagram of an example transistor layout 300 in accordance with one or more embodiments. The transistor layout 300 includes an OD region 310, a multi-finger gate structure including a plurality of polysilicon structures (i.e., polysilicon "fingers") 320a-320c, a plurality of neighboring polysilicon structures 330a-330d, a well region boundary 340, and a CESL boundary 350. Also, other components in the transistor layout 300 are simplified as a ring of other surrounding OD regions 360 and other surrounding CESL boundaries 370. Usable layout geometry parameters for implementing method 100 in accordance with one or more embodiments are defined as follows.

In some embodiments, usable layout geometry parameters include length of diffusion (LOD) geometric parameters, well proximity effect (WPE) geometric parameters, poly space effect (PSE) geometric parameters, OD space effect (OSE) geometric parameters, or boundary effect (BE) geometric parameters. The above-mentioned layout geometry parameters include various lengths and gap widths among different semiconductor structures for calculating the effects caused by the dimension of an OD region, a well region, a neighboring polysilicon structure, and/or a contact etch stop layer (CESL) structure covering the declared device.

LOD geometric parameters include parameters SA and SB. SA represents a gap width between a left-hand side (with respect to the drawing sheet) boundary of the OD region 310 and the left-most finger 320a of the gate structure. SB represents a gap width between a right-hand side boundary of the OD region 310 and the right-most finger 320c of the gate structure.

WPE geometric parameters include parameters SC_L, SC_R, SC_T, and SC_B. SC_L represents a gap width between the left-most finger 320a of the gate structure and a left-hand side boundary of the well region boundary 340. SC_R represents a gap width between the right-most finger 320c of the gate structure and a right-hand side boundary of the well region boundary 340. SC_T represents a gap width between a top boundary of the OD region 310 and a top boundary of the well region boundary 340. SC_B represents a gap width between a bottom boundary of the OD region 310 and a bottom boundary of the well region boundary 340.

PSE geometric parameters include parameters SPA_L, SPB_L, SPA_R, and SPB_R. SPA_L represents a gap width between the left-most finger 320a and a closest neighboring polysilicon structure 330a to the left of the gate structure. SPB_L represents a gap width between the left-most finger 320a of the gate structure and a next neighboring polysilicon structure 330b to the left of the gate structure. SPA_R represents a gap width between the right-most finger 320c and a closest neighboring polysilicon structure 330c to the right of the gate structure. SPB_R represents a gap width between the right-most finger 320c of the gate and a next neighboring polysilicon structure 330d to the right of the gate structure.

OSE geometric parameters include parameters SFAX_L, SFAX_R, SFY_T, and SFY_B. SFAX_L represents a gap width between the left-most finger 320a and a closest neighboring OD region of the other surrounding OD regions 360 to the left of the gate structure. SFAX_R represents a gap width between the right-most finger 320c and a closest neighboring OD region of the other surrounding OD regions 360 to the right of the gate structure. SFY_T represents a gap width between a top boundary of the OD region 310 and a closest neighboring OD region of the other surrounding OD regions 360 to the top of the OD region 310. SFY_B represents a gap width between a bottom boundary of the OD region 310 and a closest neighboring OD region of the other surrounding OD regions 360 to the bottom of the OD region 310.

BE geometric parameters include ENX_L, ENX_R, ENY_T, ENY_B, RX_L, EX_R, RY_T, and RY_B. ENX_L represents a gap width between the left-most finger 320a and a left-hand side boundary of the CESL boundary 350. ENX_R represents a gap width between the right-most finger 320c and a right-hand side boundary of the CESL boundary 350. ENY_T represents a gap width between the top boundary of the OD region 310 and a top boundary of the CESL boundary 350. ENY_B represents a gap width between the bottom boundary of the OD region 310 and a bottom boundary of the CESL boundary 350.

Moreover, RX_L represents a gap width between the left-most finger 320a and a closest one of the other surrounding CESL boundaries 370 to the left of the gate structure. RX_R represents a gap width between the right-most finger 320c and a closest one of the other surrounding CESL boundaries 370 to the right of the gate structure. RY_T represents a gap width between the top boundary of the OD region 310 and a closest one of the other surrounding CESL boundaries 370 to the top of the OD region 310. RY_B represents a gap width between the bottom boundary of the OD region 310 and a closest one of the other surrounding CESL boundaries 370 to the bottom of the OD region 310.

Other layout geometry parameters include parameters SD, L, and W. SD represents a gap width between two neighboring polysilicon structures 320a/320b or 320b/320c of the gate structure. L represents the width of the polysilicon structures 320a, 320b, and 320c (i.e., the gate length of the gate structure). W represents the width of the OD region 310 (i.e., the gate width of each finger of the gate structure). In some embodiments, additional layout geometry parameters are also defined and used. In some embodiments, not all above-mentioned layout geometry parameters are used or made usable.

Figure 4A:
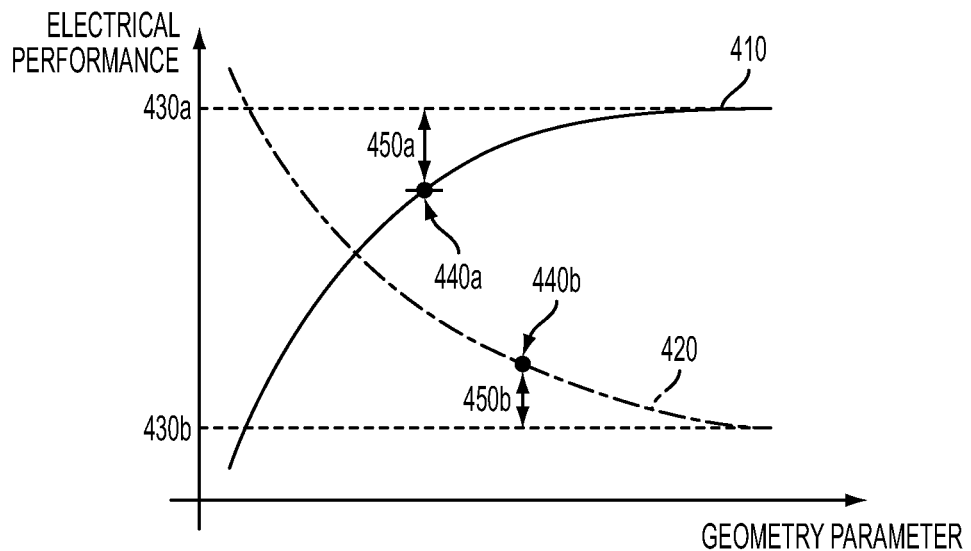
FIGS. 4A and 4B are charts of the relation between one or more layout geometry parameter and a preselected electrical performance parameter in accordance with one or more embodiments.

FIG. 4A is a chart of a layout geometry parameter versus an electrical performance parameter in accordance with one or more embodiments. In at least one embodiment, at least one electrical performance parameter increases if a geometry parameter being evaluated increases (as represented by curve 410), and at least one electrical performance parameter decreases if a geometry parameter being evaluated increases (as represented by curve 420). For example, for an example P-channel MOS transistor, a device current increases when the layout geometry parameter SPA_L increases, and the device current decreases when the geometry parameter SA increases.

In general, the impact caused by the layout-dependent effects becomes less significant with the increase of one or more of the above-mentioned gap widths. When a layout geometry parameter being evaluated becomes infinite, the electrical performance parameter reaches a reference value 430a or 430b. In operation 122 depicted in FIG. 1, in some embodiments, at least one geometry parameter is set to be greater than a saddle point value 440a or 440b, where the saddle point value 440a or 440b corresponds to a value that is within a predetermined percentage of variation 450a or 450b compared with the corresponding reference value 430a or 430b. In some embodiments, the predetermined percentage of variation 450a or 450b is 1~3%.

Figure 4B:
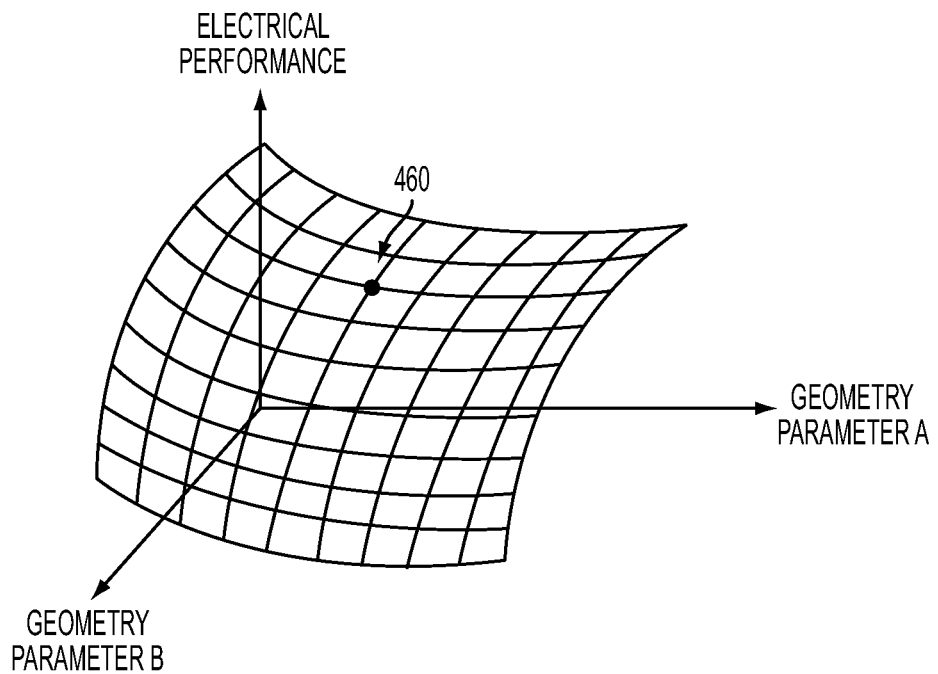

FIG. 4B is a chart of two layout geometry parameters versus an electrical performance parameter in accordance with one or more embodiments. Compared with the chart in FIG. 4A, two layout geometry parameters (Geometry Parameter A and Geometry Parameter B) are being evaluated with regard to a selected electrical performance parameter. In some embodiments, Geometry Parameter A and Geometry Parameter B are set to be greater than the values at a saddle point 460 that corresponds to a value of the selected electrical performance parameter within a predetermined percentage of variation compared with the corresponding reference value when the geometry parameters being evaluated are infinite. In some embodiments, the predetermined percentage of variation is 1~3%. In some embodiments, more than two layout geometry parameters are evaluated simultaneous with respect to the same electrical performance parameter.

In some embodiments, the controller 710, in operation 122, also receives layout preference information with the circuit design 112. In some embodiments, some of the layout geometry parameters are generated based on the received layout preference information. In at least one embodiment, if there is a conflict between a layout geometry parameter derived from, for example, a saddle point analysis and the received layout preference information, the determined layout geometry parameter overrides the received layout preference information.

In some embodiments, operation 122 of FIG. 1 further generates a layout geometry parameter that includes a set of indices indicating how a declared transistor is arranged with respect to a neighboring transistor.

Figure 5A:
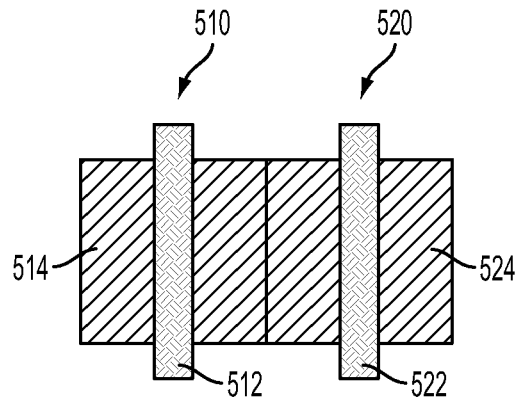
FIGS. 5A-5C are top-view diagrams of two transistors having different layout arrangements in accordance with one or more embodiments.
Figure 5B:
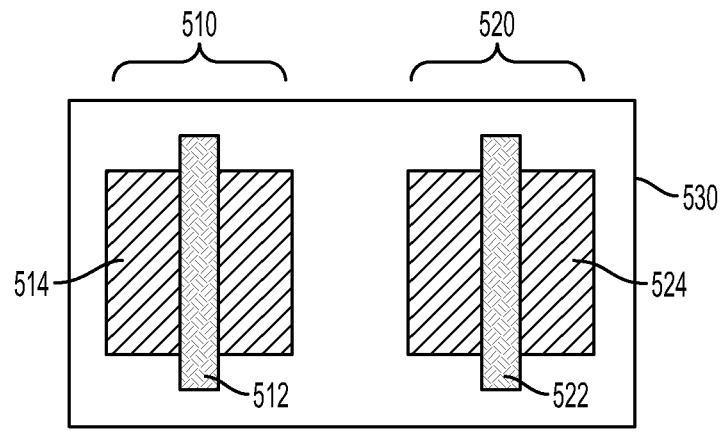
Figure 5C:
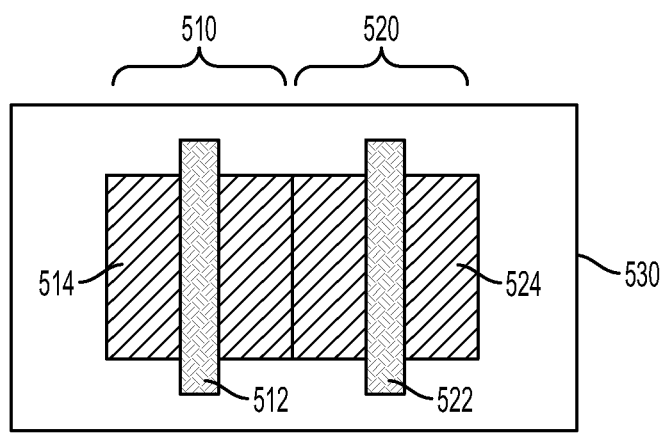

FIGS. 5A-5C are top-view diagrams of two transistors 510 and 520 having different physical arrangements in accordance with one or more embodiments. Transistor 510 includes a gate 512 and an OD region 514; and transistor 520 includes a gate 522 and an OD region 524. Depending on the type of substrate for forming the transistors 510 and 520 and the type of the transistors 510 and 520, in some embodiments, transistors 510 and 520 are formed within a well region 530. In some embodiments, the layout arrangement of two neighboring transistors 510 and 520 includes at least four possible configurations: 1) OD abutment without well-sharing (FIG. 5A); 2) well-sharing without OD abutment (FIG. 5B); 3) well-sharing and OD abutment (FIG. 5C); and 4) none of the above.

In some embodiments, the set of indices includes Index_abt, Index_nw, and Index_abt_nw each being set to be either 1 or 0. The above-mentioned scenarios 1) through 3) are recorded by setting one of the set of indices Index_abt, Index_nw, and Index_abt_nw to a value of 1. Index_abt, Index_nw, and Index_abt_nw, when all set to 0, represent the above-mentioned scenario 4). In some embodiments, the set of indices further includes an indicator identifying whether the declared transistor is identified, for layout generation purposes, as the primary transistor (master device) or the secondary transistor (slave device), and a direction from the primary transistor to the secondary transistor.

For example, the set of layout geometry parameters for the transistors M1 and M2 in FIG. 2 includes the description as follows:
*M1
*Index_abt=1 Index_nw=0 Index_abt_nw=0 master right
*SC_L=100n  SC_R=100n  SC_T=150n  SC_B=150n
  SPA_L=200n
*SPB_L=300n SPA_R=200n SPB_R=300n
*M2
*Index_abt=1 Index_nw=0 Index_abt_nw=0 slave
*SC_L=100n  SC_R=100n  SC_T=150n  SC_B=150n
  SPA_L=200n
*SPB_L=300n SPA_R=200n SPB_R=300n Therefore, for layout generation purposes, transistor M1 is identified as a primary transistor, transistor M2 is identified as a secondary transistor placed on the right-hand side of the transistor M1, and the OD regions of transistor M1 and M2 are adjacent to each other.

Moreover, after the performance of the operation 124 in FIG. 1, a portion of the consolidated netlist corresponding to the transistors M1 and M2 depicted in FIG. 2 includes:
M1 (net01 net01 net02 net03) nch_mac l=80n w=240.0n
  multi=1  nf=1  sd=140.0n  ad=2.64e-14  as=2.64e-14
  pd=700n ps=700n nrd=0.386341 nrs=0.386341
*Index_abt=1 Index_nw=0 Index_abt_nw=0 master right
*SC_L=100n  SC_R=100n  SC_T=150n  SC_B=150n
  SPA_L=200n
*SPB_L=300n SPA_R=200n SPB_R=300n
M2 (net04 net01 net02 net03) nch_mac l=80n w=1.2u
  multi=1  nf=5  sd=140.0n  ad=9.36e-14  as=9.36e-14
  pd=2.22u ps=2.22u nrd=0.082297 nrs=0.082297
*Index_abt=1 Index_nw=0 Index_abt_nw=0 slave
*SC_L=100n  SC_R=100n  SC_T=150n  SC_B=150n
  SPA_L=200n
*SPB_L=300n SPA_R=200n SPB_R=300n In at least one embodiment, the consolidated netlist for the integrated circuit 200 in FIG. 2 will be recognized by the predetermined simulation software program as a simplified version of the original netlist, because all LDE-related parameters recognizable by the simulation software program have been omitted. Meanwhile, the consolidated netlist also contains detail information for defining the requirements for preparing the circuit layout of the integrated circuit 200.

Figures 6A, 6B:
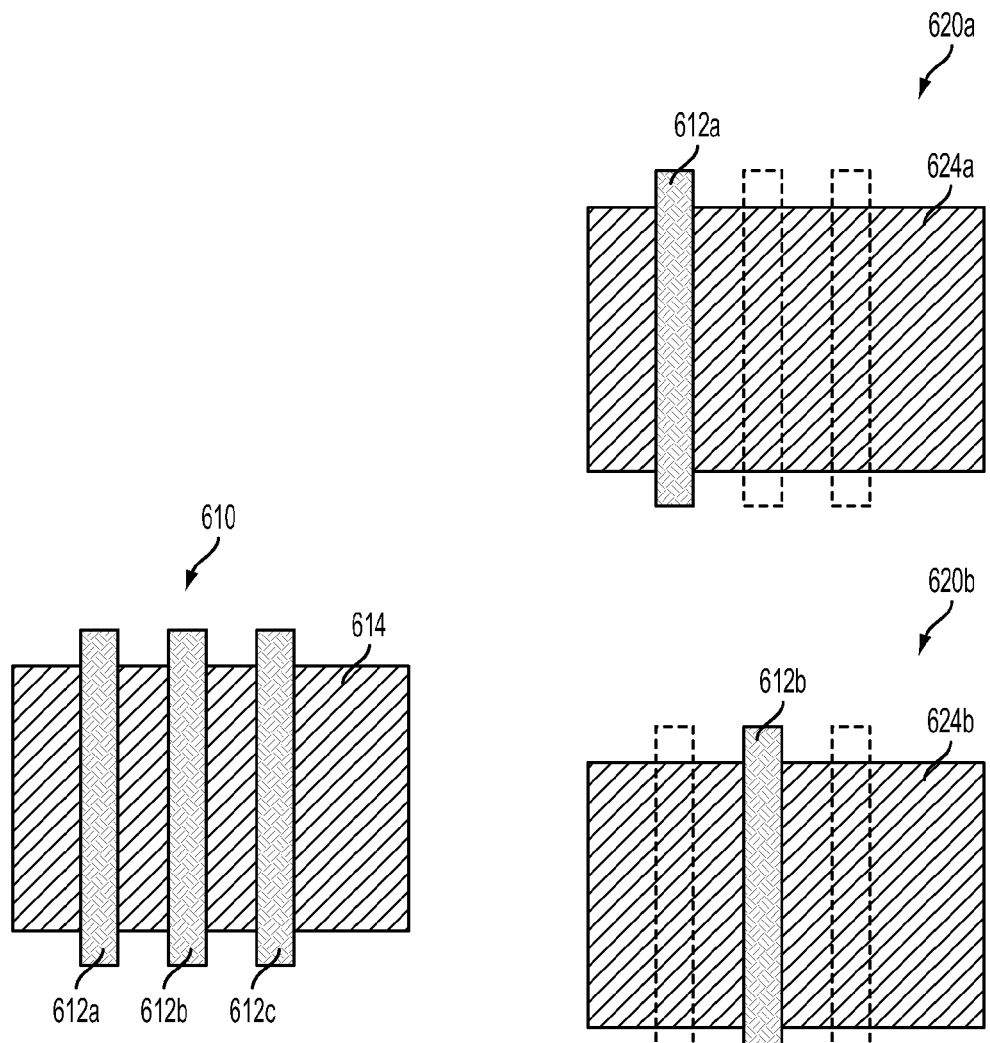
FIG. 6A is a top-view diagram of an example multi-finger transistor in accordance with one or more embodiments.
FIG. 6B is a top-view diagram of a plurality of single-finger transistors derived from the example multi-finger transistor of FIG. 6A in accordance with one or more embodiments.

FIG. 6A is a top-view diagram of an example multi-finger transistor 610 in accordance with one or more embodiments. The multi-finger transistor 610 has three parallel gate electrodes (i.e., fingers) 612a, 612b, and 612c over an OD region 614. FIG. 6B is a top-view diagram of three single-finger transistors 620a-620c derived from the example multi-finger transistor 610 of FIG. 6A in accordance with one or more embodiments. As depicted in FIG. 1 and FIGS. 6A-6B, in operation 130, the description in the consolidated netlist modeling the multi-finger transistor 610 is replaced with description modeling the three single-finger transistor 620a-620c in a decomposed consolidated netlist.

In some embodiments, the decomposition of the multi-finger transistor 610 includes generating description for modeling single-finger transistors 620a-620c each retaining a corresponding one of the fingers 612a-612c of the multi-finger transistor 610 over an OD region 624a, 624b, and 624c having the same size as the OD region 614 of the multi-finger transistor 610. The layout geometry parameters are thus recalculated for these equivalent single-finger transistors 620a-620c. In some embodiments, the recalculation of the layout geometry parameters for the equivalent single-finger transistors 620a-620c includes calculating the geometry dimensions based on the value of the layout geometry parameters of the multi-finger counterpart 610.

Returning to the example integrated circuit 200 depicted in FIG. 2 and corresponding example consolidated netlist presented above, the transistor M2 has five fingers ("nf=5"). Therefore, in operation 130, the description for modeling transistor M2 will be replaced with description for modeling five parallel-connected single-finger transistors in a decomposed consolidated netlist.

Table I lists example LDE-related instance parameters according to BSIM standard that are calculated based on the corresponding layout geometry parameters listed at the same row.

TABLE I

| | Layout geometry parameters | BSIM LDE-related instance parameters |
|---|---|---|
| LOD | SA, SB | SA, SA1, SA2, SA3, SB, SB1, SB2, SB3 |
| WPE | SC_L, SC_R, SC_T, SC_B | SCA, SCB, SCC |
| PSE | SPA_L, SPA_R, SPB_L, SPB_R | SPA, SPA1, SPA2, SPA3, SAP, SA4, SPBA, SPBA1, SAPB |
| OSE | SFAX_L, SFAX_R, SFY_T, SFY_B | SODX, SODX1, SODX2, SODY, SA5, SA6 |
| BE | ENX_L, ENX_R, ENY_T, ENY_B, RX_L, RX_R, RY_T, RY_B | ENX, ENX1, ENY, ENY1, ENY2, REX, REY |

For example of $$LOD: \frac{1}{SA_{Re-calculate} + 0.5 \times L} = \sum_{i=1}^{n} \frac{1}{SA_i + 0.5 \times L},$$

where $SA_{Re-calculate}$ is re-calculated result with finger number un-equal to 1 of BSIM LDE instance parameter, n is finger number, L is the gate-length, $SA_i$ is the length of OD diffusion of "de-composed" single-finger transistor.

Figure 7:
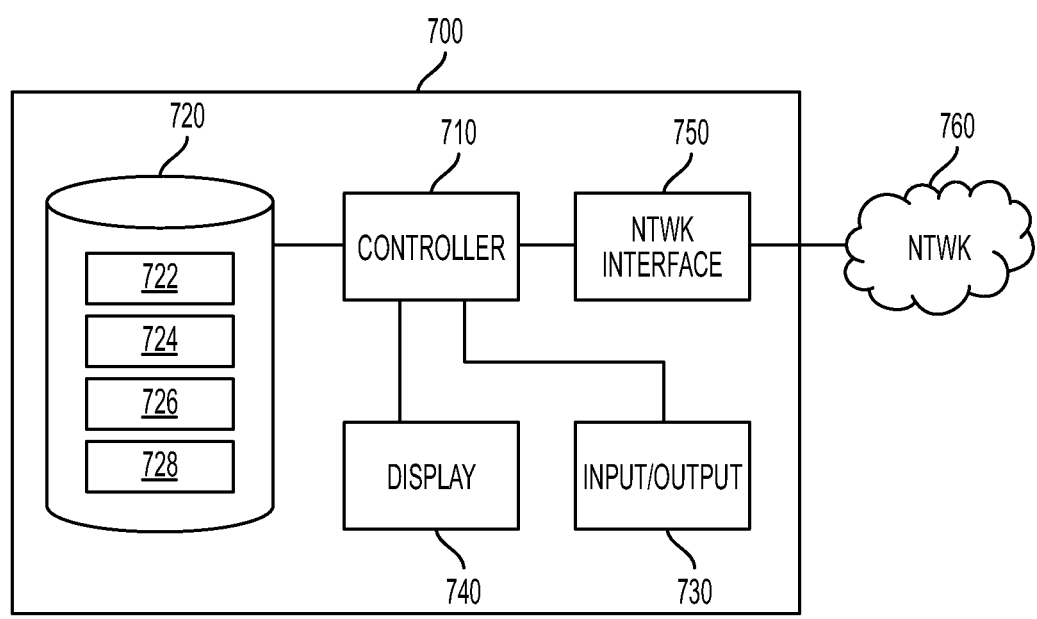
FIG. 7 is a functional block diagram of a computer system usable for implementing the method disclosed in FIG. 1 in accordance with one or more embodiments.
Figure 8:
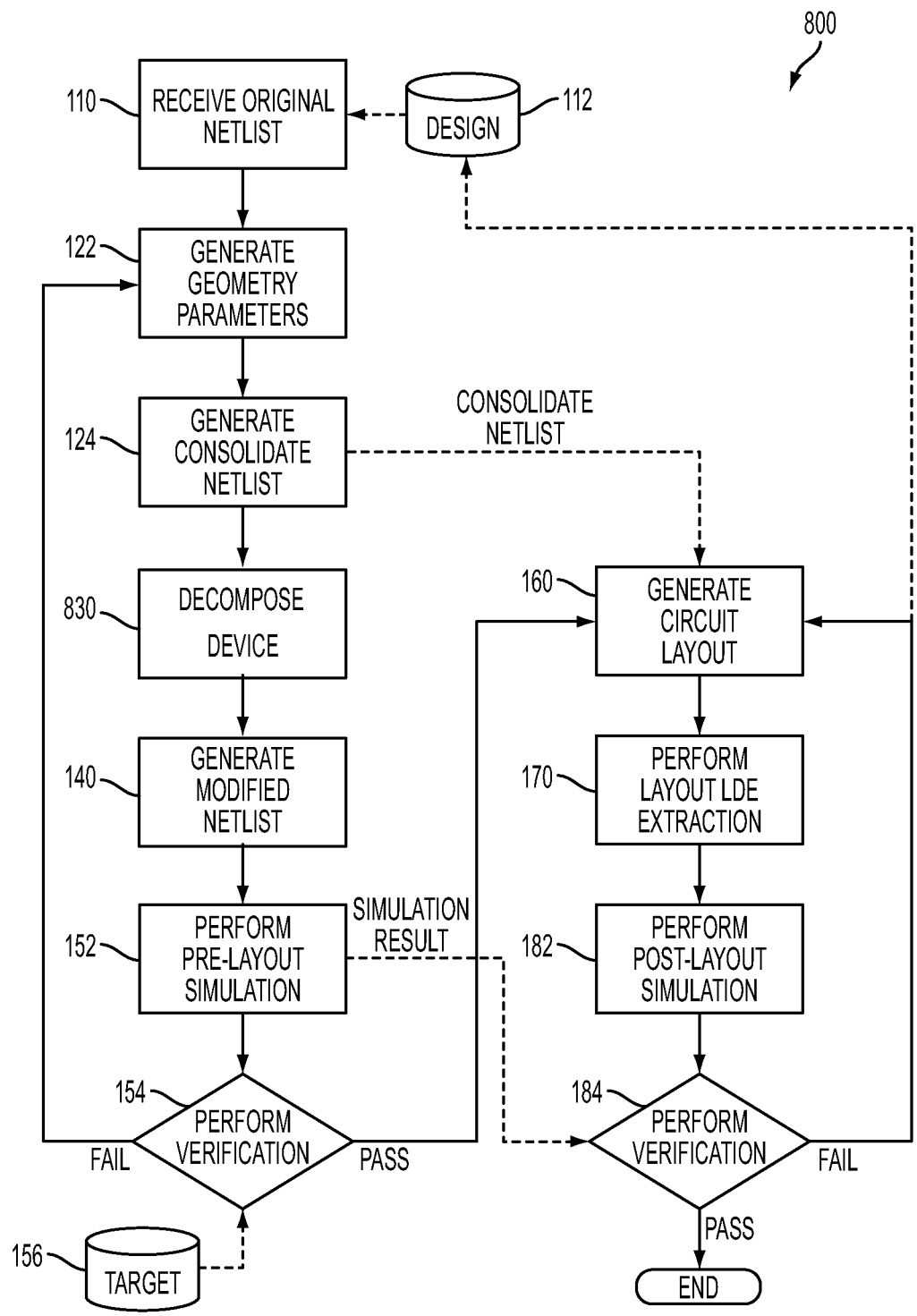
FIG. 8 is a flow chart of a method of generating a circuit layout of a circuit design in accordance with one or more embodiments.

FIG. 8 is a flow chart of a method 800 of generating a circuit layout of a circuit design in accordance with one or more embodiments. In some embodiments, additional processes are performed before, during, and/or after method 800 depicted in FIG. 8. In some embodiments, method 800 is, partially or entirely, performed by a computer system, e.g., computer system 700 (FIG. 7) having a controller 710 (FIG. 7) executing a set of computer readable instructions (such as computer program code 722 in FIG. 7).

Method 800 comprises operations 110, 122, 124, 140, 152, 154, 160, 170, 182, and 184, each of which is described above with reference to method 100 (FIG. 1); the descriptions are not repeated here for the sake of brevity. Method 800 also receives and optionally modifies design 112. Method 800 also receives targets 156. Method 800 further comprises operation 830.

Referring to FIG. 8, method 800 begins with operations 110, 122, and 124, as described above with reference to method 100 (FIG. 1). Operation 830 begins with receiving the consolidated netlist generated in operation 124. The consolidated netlist includes a first device. In some embodiments, the first device includes a single-finger transistor, a multi-finger transistor, or a single-finger of a multi-finger transistor. In some embodiments, the first device includes a plurality of OD regions. In some embodiments, the first device includes a plurality of OD regions and each OD region includes a single-finger transistor or a multi-finger transistor. In some embodiments, each finger is a gate electrode of a respective transistor.

In operation 830, a description for the first device in the consolidated netlist is decomposed into a description for a plurality of secondary devices, thereby generating a decomposed consolidated netlist that includes the description for the plurality of secondary devices. The plurality of secondary devices is based on the first device. In some embodiments, the plurality of secondary devices is a plurality of single-finger transistors. In some embodiments, each secondary device of the plurality of secondary devices includes a same OD region from a first device. In some embodiments, each secondary device of the plurality of secondary devices includes an OD region modified from an OD region of a first device. In some embodiments, subsets of secondary devices of the plurality of secondary devices correspond to one OD region of a plurality of OD regions of a first device. In some embodiments, each subset of secondary devices of the plurality of secondary devices includes one OD region of a plurality of OD regions of a first device. In some embodiments, decomposition of the first device into a plurality of secondary devices in operation 830 increases an accuracy of circuit simulation with regard to parasitic resistance-capacitance effects in comparison with methods which do not include the decomposition of operation 830.

In some embodiments, operation 830 includes recalculating the layout geometry parameters for one or more secondary devices of the plurality of secondary devices. In some embodiments, recalculation of a layout geometry parameter for a secondary device is based on geometry dimensions of the first device, one or more secondary devices, or any combination of the first device and one or more secondary devices.

After a decomposed consolidated netlist is produced in operation 830, method 800 continues with operations 140, 152, 154, 160, 170, 182, and 184 as described above with reference to method 100 (FIG. 100).

Figure 9:
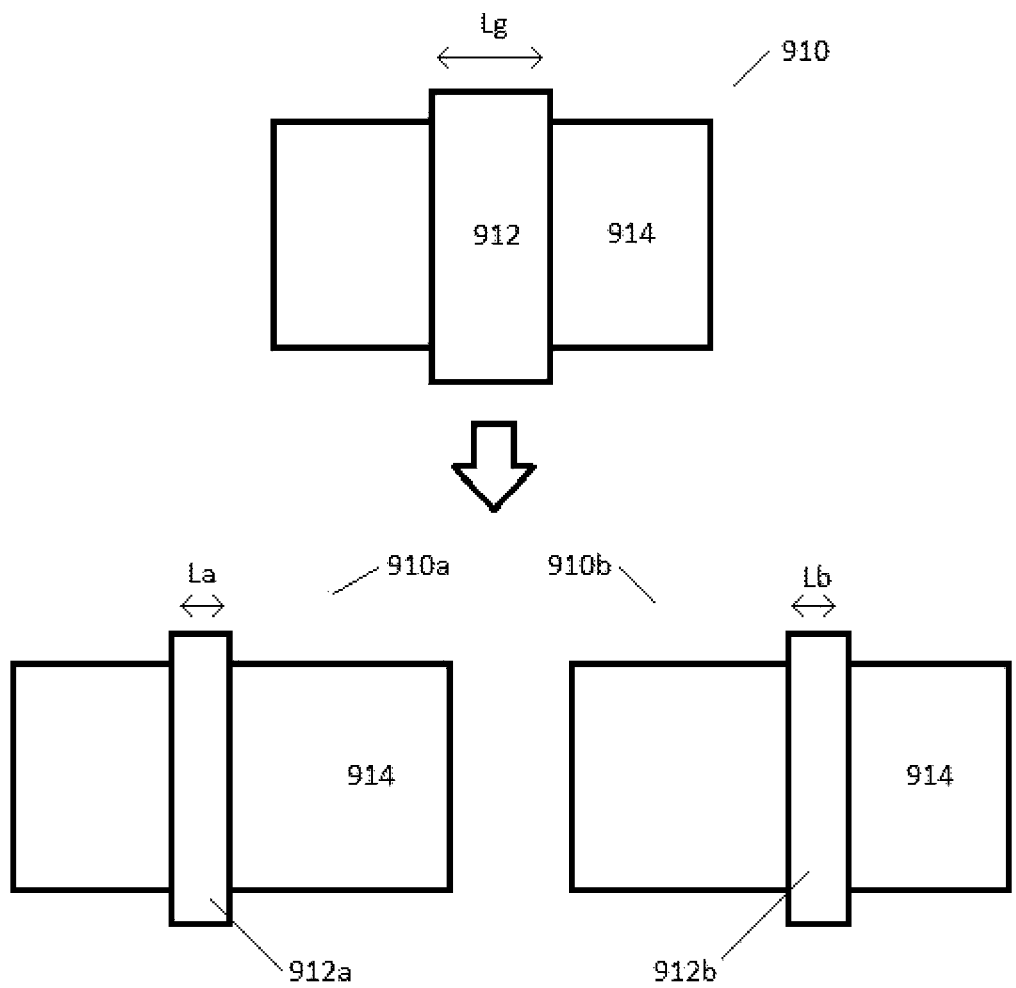
FIG. 9 is a top-view diagram of an example first device and a plurality of secondary devices in accordance with one or more embodiments.

FIG. 9 is a top-view diagram of a first device 910 and a plurality of secondary devices 910a and 910b in accordance with one or more embodiments. First device 910 has a gate electrode (i.e., finger) 912 over an OD region 914. In some embodiments, gate electrode 912 is the only gate electrode over OD region 914. In some embodiments, gate electrode 912 is one gate electrode of a plurality of gate electrodes (not shown) over OD region 914. Gate electrode 912 has a length Lg.

Each of secondary devices 910a and 910b is decomposed from first device 910 and includes OD region 914, which is the same OD region as in first device 910. In some embodiments, two secondary devices are decomposed from first device 910, as shown in FIG. 9. In some embodiments, more than two secondary devices are decomposed from first device 910. In some embodiments, a secondary device of the plurality of secondary devices is further decomposed into additional secondary devices.

Secondary device 910a has a gate electrode 912a having a length La and secondary device 910b has a gate electrode 912b having a length Lb. A sum of length La and length Lb is equal to length Lg. In some embodiments, length La and length Lb are equal. In some embodiments, length La and length Lb are unequal. In some embodiments, more than two secondary device gate electrodes have lengths that are equal or unequal. A sum of all lengths of the secondary device gates equals the length Lg of a gate electrode of a first device such as first device 910.

In some embodiments, as shown in FIG. 9, a single gate electrode 912 of first device 910 is decomposed into gate electrode 912a of secondary device 910a and gate electrode 912b of secondary device 910b. In some embodiments, each gate electrode of a plurality of gate electrodes of a first device is decomposed into gate electrodes of a plurality of secondary devices. In some embodiments, gate electrodes of a plurality of gate electrodes of a first device are decomposed into gate electrodes of a plurality of secondary devices by applying a single algorithm to the plurality of gate electrodes of the first device. In some embodiments, gate electrodes of a plurality of gate electrodes of a first device are decomposed into gate electrodes of a plurality of secondary devices by applying multiple algorithms to the plurality of gate electrodes of the first device. In some embodiments, gate electrodes of a plurality of gate electrodes of a first device are decomposed into gate electrodes of a plurality of secondary devices by applying one or more algorithms to a subset of the plurality of gate electrodes of the first device.

As depicted in FIGS. 8 and 9, in operation 830, a description in the consolidated netlist modeling first device 910 is replaced with a description modeling secondary devices 910a and 910b in a decomposed consolidated netlist. In some embodiments, decomposition of first device 910 includes generating a description modeling secondary devices 910a and 910b each retaining OD region 914 of first device 910 and replacing gate electrode 912 with gate electrodes 912a and 912b. In some embodiments, decomposition of a first device includes generating a description modelling more than two secondary devices retaining an OD region.

In some embodiments, the layout geometry parameters are recalculated for one or more of secondary devices 910a and 910b. In some embodiments, recalculation of a layout geometry parameter for secondary device 910a or secondary device 910b is based on geometry dimensions of first device 910, secondary device 910a, secondary device 910b, or any combination of first device 910, secondary device 910a, and secondary device 910b.

Figure 10:
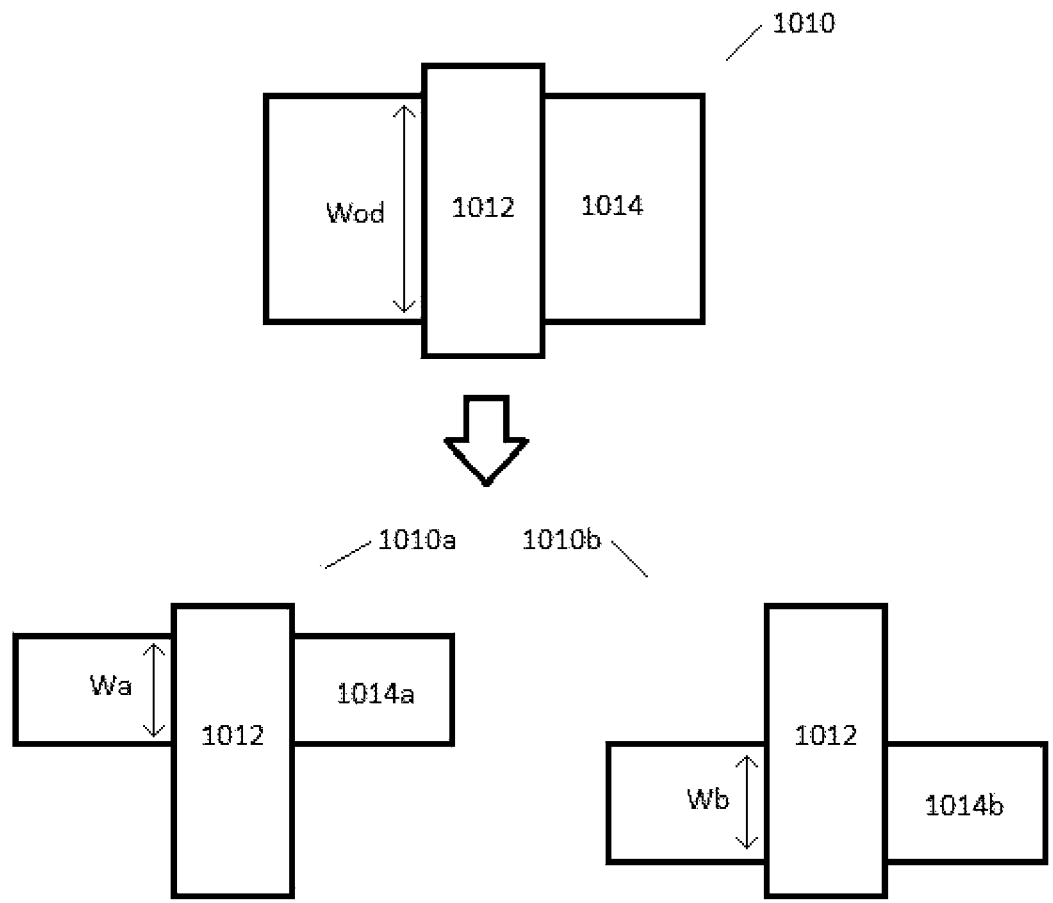
FIG. 10 is a top-view diagram of an example first device and a plurality of secondary devices in accordance with one or more embodiments.

FIG. 10 is a top-view diagram of a first device 1010 and a plurality of secondary devices 1010a and 1010b in accordance with one or more embodiments. First device 1010 has a gate electrode (i.e., finger) 1012 over an OD region 1014. In some embodiments, gate electrode 1012 is the only gate electrode over OD region 1014. In some embodiments, gate electrode 1012 is one gate electrode of a plurality of gate electrodes (not shown) over OD region 1014. OD region 1014 has a width Wod.

Each of secondary devices 1010a and 1010b is decomposed from first device 1010 and includes gate electrode 1012. In some embodiments, two secondary devices are decomposed from first device 1010, as shown in FIG. 10. In some embodiments, more than two secondary devices are decomposed from first device 1010. In some embodiments, a secondary device of the plurality of secondary devices is further decomposed into additional secondary devices.

Secondary device 1010a has an OD region 1014a having a width Wa and secondary device 1010b has an OD region 1012b having a width Wb. A sum of width Wa and width Wb is equal to Wod. In some embodiments, width Wa and width Wb are equal. In some embodiments, width Wa and width Wb are unequal. In some embodiments, more than two secondary device OD regions have widths that are equal or unequal. A sum of all widths of all OD regions of the secondary devices equals the width Wod of an OD region of a first device such as first device 1010.

In some embodiments, as shown in FIG. 10, a single OD region 1014 of first device 1010 is decomposed into OD region 1014a of secondary device 1010a and OD region 1014b of secondary device 1010b. In some embodiments, each OD region of a plurality of OD regions of a first device is decomposed into OD regions of a plurality of secondary devices. In some embodiments, OD regions of a plurality of OD regions of a first device are decomposed into OD regions of a plurality of secondary devices by applying a single algorithm to the plurality of OD regions of the first device. In some embodiments, OD regions of a plurality of OD regions of a first device are decomposed into OD regions of a plurality of secondary devices by applying multiple algorithms to the plurality of OD regions of the first device. In some embodiments, OD regions of a plurality of OD regions of a first device are decomposed into OD regions of a plurality of secondary devices by applying one or more algorithms to a subset of the plurality of OD regions of the first device.

As depicted in FIGS. 8 and 10, in operation 830, a description in the consolidated netlist modeling first device 1010 is replaced with a description modeling secondary devices 1010a and 1010b in a decomposed consolidated netlist. In some embodiments, decomposition of first device 1010 includes generating a description modeling secondary devices 1010a and 1010b each retaining gate electrode 1012 of first device 1010 and replacing OD region 1014 with OD regions 1014a and 1014b.

Figure 11:
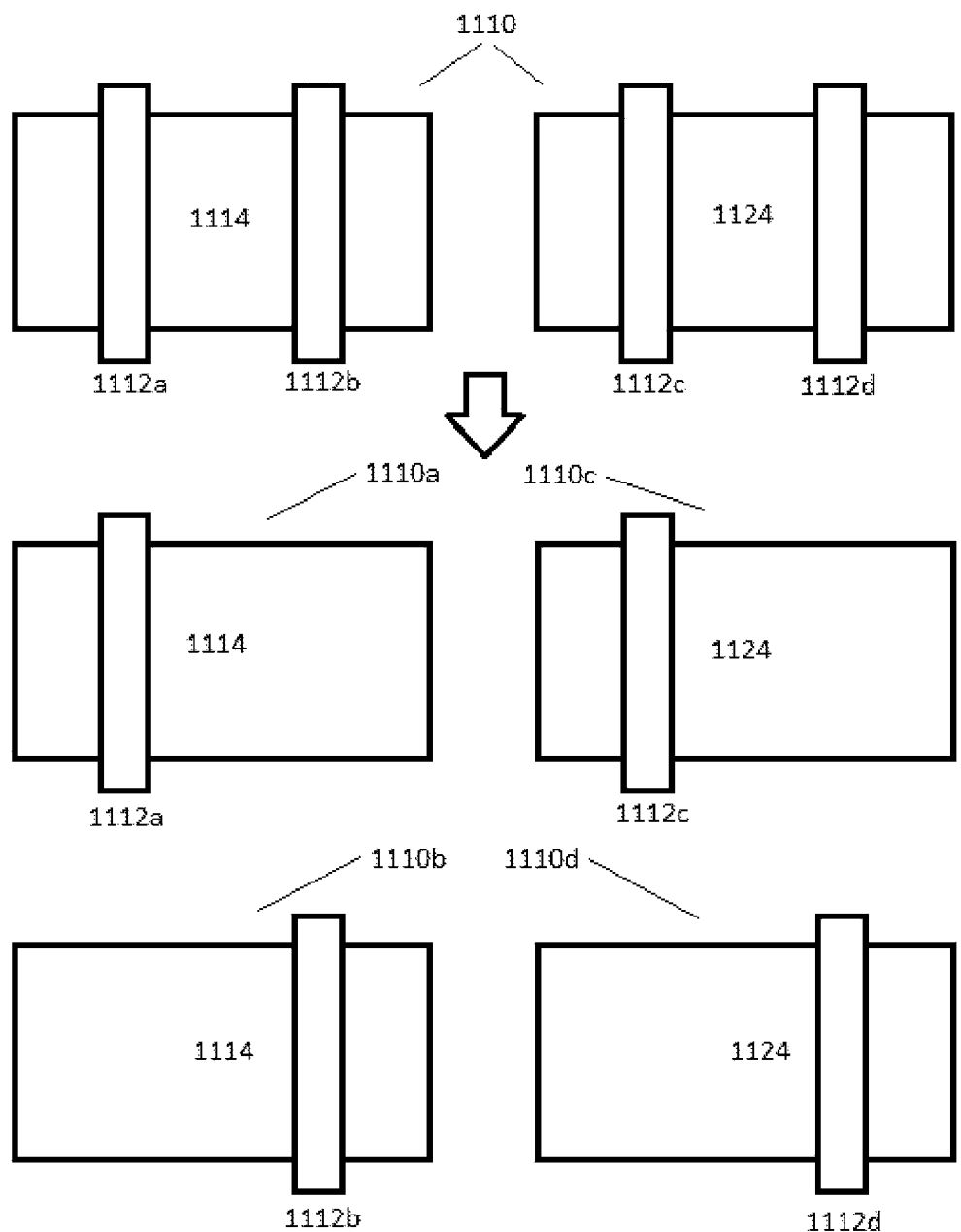
FIG. 11 is a top-view diagram of an example first device and a plurality of secondary devices in accordance with one or more embodiments.

In some embodiments, the layout geometry parameters are recalculated for one or more of secondary devices 1010a and 1010b. In some embodiments, recalculation of a layout geometry parameter for secondary device 1010a or secondary device 1010b is based on geometry dimensions of first device 1010, secondary device 1010a, secondary device 1010b, or any combination of first device 1010, secondary device 1010a, and secondary device 1010b FIG. 11 is a top-view diagram of a first device 1110 and a plurality of secondary devices 1110a-1110d in accordance with one or more embodiments. First device 1110 has gate electrodes (i.e., fingers) 1112a and 1112b over an OD region 1114 and gate electrodes 1112c and 1112d over an OD region 1124. Gate electrodes 1112a and 1112b are gate electrodes of a plurality of gate electrodes over OD region 1114. In some embodiments, a plurality of gate electrodes over OD region 1114 includes more than two gate electrodes (not shown). Gate electrodes 1112c and 1112d are gate electrodes of a plurality of gate electrodes over OD region 1124. In some embodiments, a plurality of gate electrodes over OD region 1124 includes more than two gate electrodes (not shown).

OD region 1114 and OD region 1124 are OD regions of a plurality of OD regions of first device 1110. In some embodiments, a plurality of OD regions of first device 1110 includes more than two OD regions (not shown). In some embodiments, the number of gate electrodes in the pluralities of gate electrodes of each OD region of a plurality of OD regions is the same. In some embodiments, the number of gate electrodes in the pluralities of gate electrodes of each OD region of a plurality of OD regions varies according to the OD region.

Each of secondary devices 1110a-1110d is decomposed from first device 1110. Secondary device 1110a includes OD region 1114 and no other OD region of the plurality of OD regions of first device 1110. Secondary device 1110a includes gate electrode 1112a and no other gate electrode of the plurality of electrodes of OD region 1114. Secondary device 1110a includes no other gate electrode of any plurality of gate electrodes of any other OD regions, such as OD region 1124.

Secondary device 1110b includes OD region 1114 and no other OD region of the plurality of OD regions of first device 1110. Secondary device 1110b includes gate electrode 1112b and no other gate electrode of the plurality of electrodes of OD region 1114. Secondary device 1110b includes no other gate electrode of any plurality of gate electrodes of any other OD regions, such as OD region 1124.

Secondary device 1110c includes OD region 1124 and no other OD region of the plurality of OD regions of first device 1110. Secondary device 1110c includes gate electrode 1112c and no other gate electrode of the plurality of electrodes of OD region 1124. Secondary device 1110c includes no other gate electrode of any plurality of gate electrodes of any other OD regions, such as OD region 1114.

Secondary device 1110d includes OD region 1124 and no other OD region of the plurality of OD regions of first device 1110. Secondary device 1110d includes gate electrode 1112d and no other gate electrode of the plurality of electrodes of OD region 1124. Secondary device 1110d includes no other gate electrode of any plurality of gate electrodes of any other OD regions, such as OD region 1114.

In some embodiments, a plurality of secondary devices comprises four secondary devices decomposed from first device 1110, as shown in FIG. 11. In some embodiments, more than four secondary devices are decomposed from first device 1110. In some embodiments, a secondary device of the plurality of secondary devices is further decomposed into additional secondary devices. In some embodiments, a secondary device is further decomposed in the manner described for first device 910 (FIG. 9) or first device 1010 (FIG. 10).

As depicted in FIGS. 8 and 11, in operation 830, a description in the consolidated netlist modeling first device 1110 is replaced with a description modeling secondary devices 1110a-1110d in a decomposed consolidated netlist. In some embodiments, decomposition of first device 1110 includes generating a description modeling secondary devices 1110a-1110d each retaining one of gate electrodes 1112a-1112b and one of OD regions 1114 and 1124 as described above.

In some embodiments, the layout geometry parameters are recalculated for one or more of secondary devices 1110a-1110d. In some embodiments, recalculation of a layout geometry parameter for any one of secondary devices 1110a-1110d is based on geometry dimensions of first device 1110, secondary device 1110a, secondary device 1110b, secondary device 1110c, secondary device 1110d, or any combination of first device 1110 and secondary devices 1110-1110d.

FIG. 7 is a functional block diagram of a computer system 700 usable for implementing the methods disclosed in FIGS. 1 and 8 in accordance with one or more embodiments.

Computer system 700 includes the hardware controller 710 and a non-transitory, computer readable storage medium 720 encoded with, i.e., storing, the computer program code 722, i.e., a set of executable instructions. The controller 710 is electrically coupled to the computer readable storage medium 720. The controller 710 is configured to execute the computer program code 722 encoded in the computer readable storage medium 720 in order to cause the computer 700 to be usable as an Electronic Design Automation tool for performing the generation of the consolidated netlist, the pre-layout simulation, the layout generation, and/or the post-layout simulation, as depicted in FIGS. 1 and 8.

In some embodiments, the controller 710 is a central processing unit (CPU), a multi-processor, a distributed processing system, an application specific integrated circuit (ASIC), and/or a suitable processing unit.

In some embodiments, the computer readable storage medium 720 is an electronic, magnetic, optical, electromagnetic, infrared, and/or a semiconductor system (or apparatus or device). For example, the computer readable storage medium 720 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 720 includes a compact disk-read only memory (CD-ROM), a compact disk-read/write (CD-R/W), and/or a digital video disc (DVD).

In some embodiments, the storage medium 720 stores the computer program code 722 configured to cause the computer system 700 to perform methods as depicted in FIGS. 1 and 8. In some embodiments, the storage medium 720 also stores information needed for performing methods 100 and 800 or generated during performing methods 100 and 800, such as an original netlist 724, a consolidated netlist 726, and/or data for analyzing saddle points 728.

The computer system 700 includes, in at least some embodiments, an input/output interface 730 and a display 740. The input/output interface 730 is coupled to the controller 710 and allows the circuit designer or a simulation model designer to manipulate the computer system 700 in order to perform the methods depicted in FIGS. 1 and 8. In at least some embodiments, the display 740 displays the status of operation of the methods depicted in FIGS. 1 and 9 in a real-time manner and preferably provides a Graphical User Interface (GUI). In at least some embodiments, the input/output interface 730 and the display 740 allow an operator to operate the computer system 700 in an interactive manner.

In at least some embodiments, the computer system 700 also includes a network interface 750 coupled to the controller 710. The network interface 750 allows the computer system 700 to communicate with a network 760, to which one or more other computer systems are connected. The network interface includes wireless network interfaces such as BLUETOOTH, WIFI, WIMAX, GPRS, or WCDMA; or wired network interface such as ETHERNET, USB, or IEEE-1394. In some embodiments, the methods of FIGS. 1 and 8 are implemented in two or more computer systems 700 of FIG. 7, and information such as the original netlist, the consolidated netlist, the circuit layout, and/or other information are exchanged between different computer systems via the network 760.

In some embodiments, a method of generating, based on a first netlist of an integrated circuit, a second netlist includes generating layout geometry parameters for at least a portion of the first netlist of the integrated circuit. The portion of the first netlist of the integrated circuit includes a first device. A third netlist is generated based on the first netlist and the layout geometry parameters. A description in the third netlist for modeling the first device is decomposed into a description in a fourth netlist for modeling a plurality of secondary devices. The second netlist is generated based on the fourth netlist. In some embodiments, at least one of the above operations is performed by a computer.

In some embodiments, a method of performing a circuit simulation for an integrated circuit includes generating layout geometry parameters for at least a portion of a first netlist of the integrated circuit. The portion of the first netlist of the integrated circuit includes a first device. A second netlist is generated by combining the first netlist and the layout geometry parameters. The first device in the second netlist is decomposed into a plurality of secondary devices in a third netlist, each secondary device of the plurality of secondary devices in the third netlist including recalculated layout geometry parameters. A fourth netlist is generated based on the third netlist. The generation of the fourth netlist comprises calculating a set of layout-dependent effect related (LDE-related) instance parameters recognizable by a simulation software program according to the layout geometry parameters. By executing the simulation software program, the circuit simulation is performed based on the fourth netlist. In some embodiments, at least one of the above operations is performed by a computer.

In some embodiments, a non-transitory computer readable medium is encoded with instructions. The instructions are arranged to cause a computer to generate layout geometry parameters for at least a portion of a first netlist of the integrated circuit, and to generate a second netlist based on the first netlist and the layout geometry parameters. The portion of the first netlist of the integrated circuit includes a first device and the instructions are arranged to further cause the computer to decompose the first device into a plurality of secondary devices in a third netlist.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating, based on a first netlist of an integrated circuit, a second netlist, the method comprising:
generating layout geometry parameters for at least a portion of the first netlist of the integrated circuit, wherein the portion of the first netlist of the integrated circuit comprises a first device;
generating a third netlist based on the first netlist and the layout geometry parameters;
decomposing a description in the third netlist for modeling the first device into a description in a fourth netlist for modeling a plurality of secondary devices; and
generating the second netlist based on the fourth netlist;
wherein at least one of the above operations is performed by a computer; and
at least one of the following configurations exists: the first device includes (a) a first gate electrode having a first length; or (b) a first oxide diffusion (OD) region having a first width;
when the first device includes the first gate electrode having the first length:

each secondary device of the plurality of secondary devices comprises a secondary gate electrode having a secondary length, and
a sum of each of the secondary lengths of the secondary gate electrodes of the plurality of secondary devices is equal to the first length; and
when the first device includes the first OD region having the first width:
each secondary device of the plurality of secondary devices comprises a secondary OD region having a secondary width; and
a sum of each of the secondary widths of the secondary OD regions of the plurality of secondary devices is equal to the first width.

2. The method of claim 1, wherein when the first device is configured to include the first gate electrode having the first length,
the first device further includes a second OD region and a third OD region;
each secondary device of the plurality of secondary devices comprises a single OD region; and
a first subset of the plurality of secondary devices each comprises the second OD region and a second subset of the plurality of secondary devices each comprises the third OD region.

3. The method of claim 2, wherein:
the second OD region comprises a first plurality of gate electrodes and the third OD region comprises a second plurality of gate electrodes;
each secondary device of the plurality of secondary devices further comprises a single gate electrode;
the first subset of the plurality of secondary devices each further comprises a corresponding gate electrode of the first plurality of gate electrodes; and
the second subset of the plurality of secondary devices each further comprises a corresponding gate electrode of the second plurality of gate electrodes.

4. The method of claim 1, wherein generating the second netlist comprises calculating a set of layout-dependent effect-related (LDE-related) instance parameters recognizable by a simulation software program according to the layout geometry parameters.

5. The method of claim 1, further comprising performing a pre-layout simulation based on the second netlist, wherein the pre-layout simulation is performed by executing a simulation software program, and the layout geometry parameters are recognizable by the simulation software program.

6. The method of claim 5, further comprising modifying the layout geometry parameters if a discrepancy between a result of the pre-layout simulation and a set of predetermined performance targets is greater than a predetermined tolerance.

7. The method of claim 1, wherein the generation of the layout geometry parameters comprises setting at least one of the layout geometry parameters to be greater than a saddle point value, the saddle point value corresponding to an electrical performance parameter value within a predetermined percentage of variation compared with a reference value of the electrical performance parameter if the at least one of the layout geometry parameters is set to be infinite.

8. The method of claim 1, further comprising generating a circuit layout based on the second netlist.

9. The method of claim 1, wherein the layout geometry parameters comprise length of diffusion geometric parameters, well proximity effect geometric parameters, poly space effect geometric parameters, OD space effect geometric parameters, boundary effect geometric parameters, gap width, gate length, or OD width.

10. A method of generating a modified netlist of an integrated circuit, the method comprising:
   generating layout geometry parameters for at least a portion of a netlist of the integrated circuit, wherein the portion of the netlist of the integrated circuit comprises a first device;
   generating a consolidated netlist by combining the netlist and the layout geometry parameters;
   decomposing, using a controller, the first device in the consolidated netlist into a plurality of secondary devices in a decomposed consolidated netlist; and
   generating the modified netlist based on the decomposed consolidated netlist; and
   at least one of the following configurations exists: the first device includes (a) a first gate electrode having a first length; or (b) a first oxide diffusion (OD) region having a first width;
   when the first device includes the first gate electrode having the first length:
      each secondary device of the plurality of secondary devices comprises a secondary gate electrode having a secondary length, and
      a sum of each of the secondary lengths of the secondary gate electrodes of the plurality of secondary devices is equal to the first length; and
   when the first device includes the first OD region having the first width:
      each secondary device of the plurality of secondary devices comprises a secondary OD region having a secondary width; and
      a sum of each of the secondary widths of the secondary OD regions of the plurality of secondary devices is equal to the first width.

11. The method of claim 10, wherein decomposing the first device comprises recalculating the layout geometry parameters for each secondary device of the plurality of secondary devices.

12. The method of claim 10, wherein generating the modified netlist comprises calculating a set of layout-dependent effect-related (LDE-related) instance parameters recognizable by a simulation software program according to the layout geometry parameters.

13. The method of claim 12, further comprising performing, by executing the simulation software program, the circuit simulation based on the modified netlist.

14. A method of generating a modified netlist, the method comprising:
   generating layout geometry parameters for at least a portion of a netlist of the integrated circuit, wherein the portion of the netlist of the integrated circuit comprises a first device, and generating the layout geometry parameters comprises decomposing, using a controller, the first device into a plurality of secondary devices; and
   generating a consolidated netlist by combining the netlist and the layout geometry parameters; and
   at least one of the following configurations exists: the first device includes (a) a first gate electrode having a first length; or (b) a first oxide diffusion (OD) region having a first width;
   when the first device includes the first gate electrode having the first length:
      each secondary device of the plurality of secondary devices comprises a secondary gate electrode having a secondary length, and
      a sum of each of the secondary lengths of the secondary gate electrodes of the plurality of secondary devices is equal to the first length; and
   when the first device includes the first OD region having the first width:
      each secondary device of the plurality of secondary devices comprises a secondary OD region having a secondary width; and
      a sum of each of the secondary widths of the secondary OD regions of the plurality of secondary devices is equal to the first width.

15. A method of performing a circuit simulation for an integrated circuit the method comprising:
   generating layout geometry parameters for at least a portion of a first netlist of an integrated circuit, wherein the portion of the first netlist of the integrated circuit comprises a first device;
   generating a second netlist based on the first netlist and the layout geometry parameters;
   decomposing the first device in the second netlist into a plurality of secondary devices in a third netlist, each secondary device of the plurality of secondary devices in the third netlist including recalculated layout geometry parameters;
   generating a fourth netlist based on the third netlist, wherein the generation of the fourth netlist comprises calculating a set of layout-dependent effect-related (LDE-related) instance parameters recognizable by a simulation software program according to the layout geometry parameters; and
   performing, by executing the simulation software program, the circuit simulation based on the fourth netlist;
   wherein at least one of the above operations is performed by a computer; and
   at least one of the following configurations exists: the first device includes (a) a first gate electrode having a first length; or (b) a first oxide diffusion (OD) region having a first width;
   when the first device includes the first gate electrode having the first length:
      each secondary device of the plurality of secondary devices comprises a secondary gate electrode having a secondary length, and
      a sum of each of the secondary lengths of the secondary gate electrodes of the plurality of secondary devices is equal to the first length; and
   when the first device includes the first gate OD region having the first width:
      each secondary device of the plurality of secondary devices comprises a secondary OD region having a secondary width; and
      a sum of each of the secondary widths of the secondary OD regions of the plurality of secondary devices is equal to the first width.

16. The method of claim 15, wherein when the first device is configured to include the first gate electrode having the first length,
   the first device further includes a second OD region and a third OD region;
   the second OD region comprises a first plurality of gate electrodes and the third OD region comprises a second plurality of gate electrodes;
   each secondary device of the plurality of secondary devices comprises a single OD region and a single gate electrode;

a first subset of the plurality of secondary devices each comprises the second OD region and a corresponding gate electrode of the first plurality of gate electrodes; and a second subset of the plurality of secondary devices each comprises the third OD region and a corresponding gate electrode of the second plurality of gate electrodes.

17. The method of claim 15, wherein the layout geometry parameters comprise length of diffusion geometric parameters, well proximity effect geometric parameters, poly space effect geometric parameters, OD space effect geometric parameters, boundary effect geometric parameters, gap width, gate length, or OD width.

18. A non-transitory computer readable medium encoded with instructions, the instructions being arranged to cause a computer to:

generate layout geometry parameters for at least a portion of a first netlist of an integrated circuit; and generate a second netlist based on the first netlist and the layout geometry parameters;

wherein the portion of the first netlist of the integrated circuit comprises a first device, and the instructions are arranged to further cause the computer to decompose the first device into a plurality of secondary devices in a third netlist; and at least one of the following configurations exists: the first device includes (a) a first gate electrode having a first length; or (b) a first oxide diffusion (OD) region having a first width;

when the first device includes the first gate electrode having the first length:

each secondary device of the plurality of secondary devices comprises a secondary gate electrode having a secondary length, and a sum of each of the secondary lengths of the secondary gate electrodes of the plurality of secondary devices is equal to the first length; and when the first device includes the first gate OD region having the first width:

each secondary device of the plurality of secondary devices comprises a secondary OD region having a secondary width; and a sum of each of the secondary widths of the secondary OD regions of the plurality of secondary devices is equal to the first width.

19. The non-transitory computer readable medium of claim 18, wherein when the first device is configured to include the first gate electrode having the first length, the first device further includes a second OD region and a third OD region;

the second OD region comprises a first plurality of gate electrodes and the third OD region comprises a second plurality of gate electrodes;

each secondary device of the plurality of secondary devices comprises a single OD region and a single gate electrode;

a first subset of the plurality of secondary devices each comprises the second OD region and a corresponding gate electrode of the first plurality of gate electrodes; and a second subset of the plurality of secondary devices each comprises the third OD region and a corresponding gate electrode of the second plurality of gate electrodes.

* * * * *